G. SINCLAIR.
METHOD OF TREATING MILK.
APPLICATION FILED AUG. 13, 1914.
1,175,876.
Patented Mar. 14, 1916.
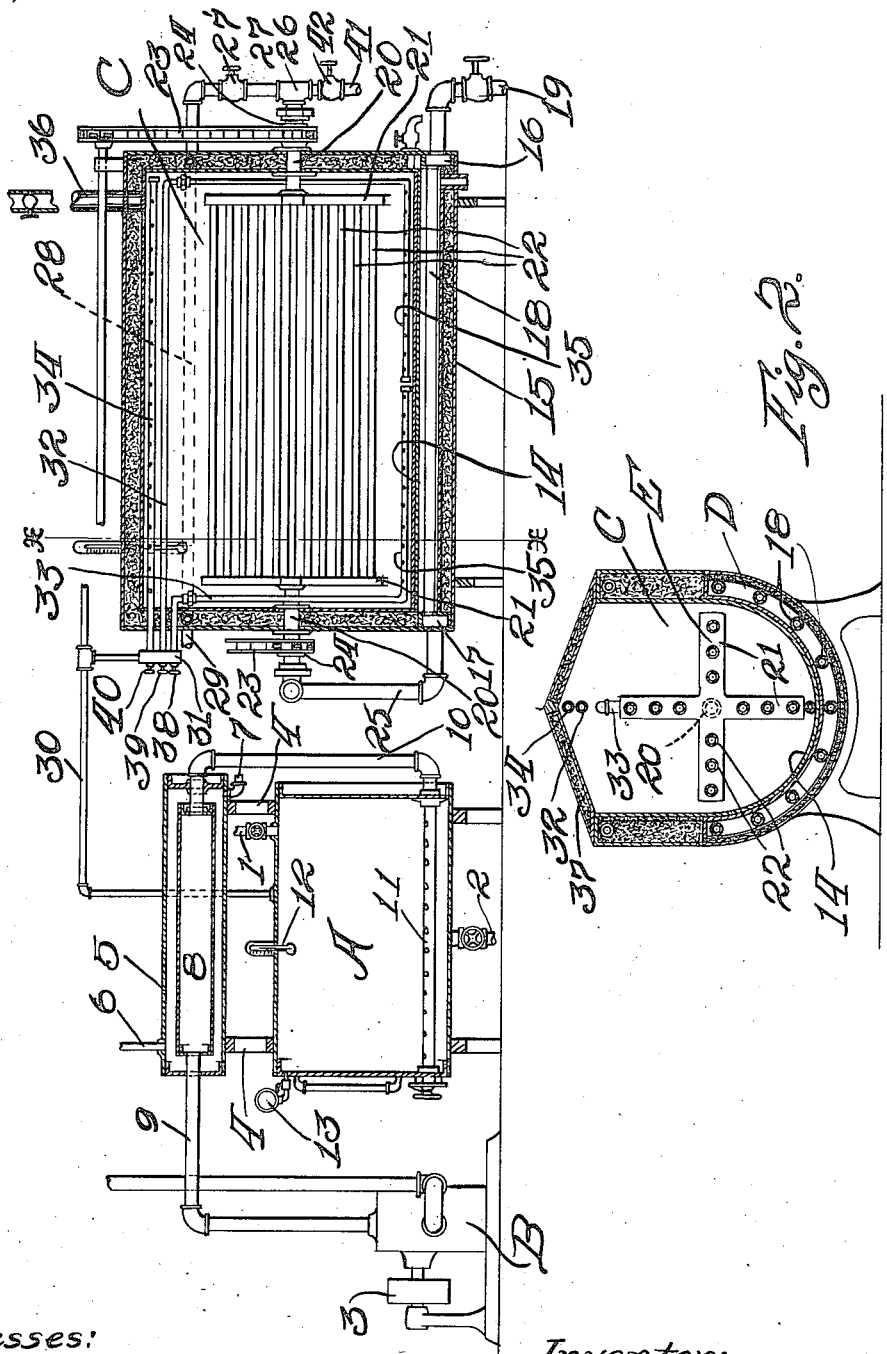
Witnesses:
Inventor:
George Sinclair,
by: H. G. Bradbury.
Attorney.

UNITED STATES PATENT OFFICE.

GEORGE SINCLAIR, OF ST. PAUL, MINNESOTA, ASSIGNOR TO CLIFFORD L. NILES, OF ANAMOSA, IOWA.

METHOD OF TREATING MILK.

1,175,876.

Specification of Letters Patent. Patented Mar. 14, 1916.

Application filed August 13, 1914. Serial No. 856,584.

*To all whom it may concern:*

Be it known that I, GEORGE SINCLAIR, a citizen of the United States, residing at St. Paul in the county of Ramsey and State of Minnesota, have invented a new and useful Improvement in Methods of Treating Milk, of which the following is a specification.

This invention relates to a new process of treating liquids and is especially adapted for use in connection with the pasteurization of milk and cream, the particular object of the method employed being the application of heat for the destruction and elimination of the undesirable germs, as those of decomposition and disease present in milk fresh from a dairy, and the cultivation of the "pure milk" germs, or those giving the milk its agreeable aroma and natural taste, and to do this in such a way that the milk has not the cooked and deadened taste commonly attendant to some other like processes.

In former processes it has been common to "flash," or suddenly elevate the temperature, and then quickly cool the milk. This results in destruction of nearly all germ life, beneficial as well as harmful, and gives an inferior product. The gradual raise of temperature increases the resistance of the desirable germs by "acclimatization," and a higher temperature may be endured. A sterile milk has no lactic acid bacteria, and the beneficent results of the action of this organism on the digestive canal are naturally lacking, hence the milk is an inferior product. This has led to the refertilization of such milk by implantation of cultures of flavoring bacteria, as "Butter flavor," "Flavorine" etc., of pure lactic acid bacteria and pure lactic acid in an attempt to rehabilitate the milk in which the germs have been destroyed. These germs, after an incubation in which they are not retarded by harmful bacteria and impurities, and thus obliged to fight for existence, develop a most excellent flavor in the milk, and remain sufficiently resistant to withstand the final or pasteurizing heat; and remain as active agents in the milk when consumed.

It is a well known fact that all milk is affected by the sanitary condition of the dairy where drawn, and by its later care and treatment, and it is an object of this present process to remove the impurities in the milk tending to taint the same; and to act deleteriously on the beneficial and valuable part of its germ life, as soon as possible, using due caution toward the cultivation and preservation of this "pure" germ life. Naturally the sooner treated after being drawn the better, as the harmful germs have not had a chance to develop and compete with the beneficent germs. The presence of a suitable degree of heat and lactic acid greatly increase the activity of the beneficent germs (such as *B. acidi lacti*) and it is the opinion of some that these germs overcome the harmful germ life and eliminate it.

With this end in view, the invention consists, broadly, in first raising the temperature of the milk to about 145 to 155 degrees F., the application of such heat being regulated according to the amount of contamination in the milk, as determined by bacteriological test or otherwise and subjecting the milk during this heating operation to a variable flow of sterile, washed air over, about and up through the same; rapidly raising the temperature to approximately 180 degrees F., and then immediately and rapidly cooling; finally, incubating at about 50 degrees F. in sterile air.

The invention consists in certain other novel steps which will be hereinafter described and claimed.

In the accompanying drawing is shown one, and the preferred, form of apparatus by means of which the process may be carried into effect, and in which—

Figure 1 is a side elevation, partly in section and parts broken away, of the device; and Fig. 2 is a section taken on line X—X of Fig. 1.

In the accompanying drawing, A indicates a tank into which water is fed through an inlet 1 and from which the water may be withdrawn through an outlet 2.

B indicates a blower having a fan (not shown), adapted to be driven by a suitable motor 3, and C indicates a closed jacketed vat in which is placed the body of milk to be treated.

Arranged above the tank A, as by spacing arms 4, is a horizontally disposed hot-water or steam jacket 5 having an inlet 6 and an outlet 7, while within the jacket is located an elongated heating chamber 8, one end of which is connected with the blower B by means of a pipe 9, as shown, extending through the jacket 5. At its opposite end, the heating chamber delivers through a pipe connection 10 into a perforated pipe 11 located within the tank A and extending entirely across the bottom of the same. A thermometer 12 and a pressure gage 13 may be used if desired.

The vat C is in the form of a jacket having an inner wall 14 and an outer wall 15, the space within containing a radiator D composed of two heads 16 and 17 communicating with one another through the medium of a plurality of longitudinal pipes designated by the numeral 18 which are distributed around the lower portion of the vat so as to effect an equal distribution of heat passed into the radiator, through the inlet 19 and head 16, to the contents of the vat.

A revolving radiator E is carried upon a hollow shaft 20 extending through suitable bearings in opposite ends of the vat and comprises two sets, as shown, of spaced cylindrical arms 21 communicating with the interior of the shaft and extending at right angles thereto, the arms of one set being connected with the corresponding arms of the other set by means of the longitudinal piping 22, as shown. The shaft 20 may be rotated by means of chains 23 meshing with gear wheels 24 carried by the shaft outside of the vat, said chains being driven from any suitable source of power. The head 17 of the radiator D is connected with the shaft 20 of the radiator E by means of a pipe 25.

When it is desired to raise the temperature of the contents of the vat C, a heating medium is passed from a suitable heater, not shown, through the inlet 19 into the radiator D, thence through the connecting pipe 25 to the revolving radiator E, and from which it is directed via the T 26 either back to the heater through the connection 41, having a valve 42, and which forms a complete circuit as will be understood, or through the connection 27, having a valve 27', to a coil 28 placed in the upper portion of the vat above the radiator E and from which it passes through a pipe 29 leading to the heater, or otherwise. The valves 42 and 27' serve as a means for regulating the amount of heating medium passing through the radiating coils and consequently the temperature of the contents of the vat.

In carrying out my invention, I place a body of water ranging in temperature from 47 to 70 degrees Fahrenheit in the tank A and fill the vat C with the milk or other liquid to be treated. After carefully determining the amount of impurities in the liquid—the presence of which affects the odor thereof—heat is introduced into and through the several radiators and coil as above suggested so that there is an equal distribution of heat throughout the contents treated. The temperature is thus increased until 145 to 155 degrees Fahrenheit is reached; resulting in the elimination or destruction of the weaker and harmful germs, and the conversion of the beneficial organisms (for example, *Bacillus acidi lacti*) into their spores. The germs in development are eliminated. The foul and animal odors are discharged from the liquid, which is thus rendered quite sweet and pure. By extensive experiment, it has been found that the best results are obtained by regulating the application of this heat according to the condition of the milk, i. e., the temperature is raised slowly if the odor of the milk is excessive or bad, and if good, the temperature is raised rapidly, care being taken not to raise the temperature above 155 degrees F. until the odors emanating therefrom have become clean and agreeable. In order to effectually remove all gases generated by this step, air is continuously forced by means of the motor driven fan or blower B through the chamber 8 wherein it may be heated, if desired, by means of the jacket 5 and from which it is delivered into the tank A, washed and cleansed of impurities during its passage through the body of water in the tank and permitted to escape therefrom through a pipe 30 connecting with a chamber 31 from which extend, through a wall of the vat C, a series of pipes 32, 33 and 34, the first two of which are arranged to deliver down either side within the vat and terminate in horizontal perforated pipes 35 disposed in the bottom of the vat. The pipe 34 terminates above the surface of the liquid within the vat for delivering a forced draft of air thereover to remove from the liquid any and all gases resulting from the aeration of the liquid, said gases passing out through an outlet 36 formed in the cover member 37 with which the vat C is provided. The temperature of 145 to 155 degrees F. and the passage of the washed air over, about and up through the milk are continued until the odor of the milk becomes cleanly and agreeable.

As the primary application of heat is advanced in degree, the evolution of the gases is correspondingly increased and it will be appreciated that a greater force or flow of washed air through the pipes 32, 33 and 34 will be required to properly cope with such gases to drive them off from the liquid through the exhaust pipe 36. In order that the flow of air may be properly adjusted, the chamber 31 is provided with valves 38, 39 and 40 coöperating with the pipes 32, 33 and 34, respectively.

When it is desired to use the milk or cream within a comparatively short time, it is first raised to 145 or 155 degrees F., as aforesaid, and after the odor has become clean and agreeable, the temperature is immediately increased to 170 to 185 degrees F., and then cooled to a "ripening" temperature, or that best adapted for the development of the germs giving the milk its agreeable flavor and aroma, and permitted to stand in sterile air for a short period of time.

During the second or rapid heating of the liquid, a flow of sterile air may be directed to advantage thereover in order to remove any possible foul odors remaining after the primary treatment or which might generate during the "flash". If, however, it is not necessary to hasten the operation, the temperature of the liquid treated is first raised to 145 or 155 degrees F., then cooled to 58 degrees F. and held at this temperature for about twenty-four hours surrounded by clean sterile air; after which the liquid is rapidly reheated to a temperature of 170 to 185 degrees F., and then at once cooled and held in sterile air for seventy-two hours, or longer, at a constant temperature of 58 degrees F. so as to cause a full development of the beneficent germ life.

From the foregoing description, taken in connection with the accompanying drawing, it is believed that the process will be fully understood without requiring an extended explanation. It may be well, however, to lay stress on the fact that the essence of my invention resides in the partial sterilization of the milk by heating to a temperature sufficient to kill harmful germs and convert the beneficial ones to spores, while at the same time all disagreeable odors are disengaged; and allowing this milk to cool and stand at an incubating temperature until the beneficial germs are well developed again. These germs have been "acclimated" to an increased temperature, and are now rapidly "flashed" to kill all the harmful bacteria which may have survived the first operation, the "flash" temperature and time, however, not being sufficient to kill the beneficial germs.

Having thus fully described my invention, what is claimed and desired to be secured by Letters Patent is—

1. The preparation of a milk containing *B. acidi lacti* by a gradual heating to inure the germs and their spores to a high temperature, meanwhile introducing air to scavenge away all foul gases, cooling and incubating the milk containing *B. acidi lacti* remaining, momentarily flashing the temperature to above that of the first heating, and rapidly cooling the milk.

2. The process of pasteurizing milk consisting in gradually heating to approximately 150 degrees F., passing sterile air over, about, and up through the milk during said heating operation, cooling and incubating such milk, and finally flashing to near the death point of the *B. acidi lacti* contained therein.

3. The pasteurization of milk by gradually heating to approximately 150 degrees F., passing sterile air therethrough during said heating operation, cooling and incubating at 58 degrees F., flashing to approximately 180 degrees F. and immediately rapidly cooling said milk, and finally again incubating at 58 degrees F.

4. The preparation of a milk containing germs valuable to the digestive system by a gradual heating to approximately 150 degrees F. to inure said germs to an increased temperature and to destroy deleterious organisms, sterile air being used to scavenge all foul gases, liberated during said heating, cooling to 58 degrees F. and incubating at this temperature, until the germ life is again well developed, flashing the temperature to 180 degrees F. for a short time to destroy all deleterious organisms remaining, again cooling to 58 degrees F. and incubating until the digestively valuable germs are well developed.

5. The process of pasteurizing milk consisting in gradually heating to approximately 150 degrees F., passing sterile air over, about and up through the milk during said heating operation, then flashing to approximately 180 degrees F., and finally incubating at 58 degrees F.

6. The process of pasteurizing milk consisting in gradually heating to approximately 150 degrees F., then "flashing" to approximately 180 degrees F., passing sterile air over and about the milk during said heating operations, and finally incubating at 58 degrees F.

In testimony whereof, I have signed my name to this specification in the presence of two subscribing witnesses.

GEORGE SINCLAIR.

Witnesses:
 L. W. HOLMES,
 HENRY P. ALDEN.